(12) United States Patent
Tormasov et al.

(10) Patent No.: US 12,333,049 B2
(45) Date of Patent: Jun. 17, 2025

(54) SYSTEMS AND METHODS FOR CONTROLLING DATA ACCESS IN THE PRESENCE OF UNAUTHORIZED PERSONS

(71) Applicant: Acronis International GmbH, Schaffhausen (CH)

(72) Inventors: Alexander Tormasov, Bremen (DE); Serg Bell, Costa del Sol (SG); Stanislav Protasov, Singapore (SG)

(73) Assignee: Acronis International GmbH, Schaffhausen (CH)

( * ) Notice: Subject to any disclaimer, the term of this patent is extended or adjusted under 35 U.S.C. 154(b) by 129 days.

(21) Appl. No.: 17/968,297

(22) Filed: Oct. 18, 2022

(65) Prior Publication Data

US 2023/0195935 A1    Jun. 22, 2023

Related U.S. Application Data

(60) Provisional application No. 63/292,236, filed on Dec. 21, 2021.

(51) Int. Cl.
| | |
|---|---|
| *G06F 21/62* | (2013.01) |
| *G06F 21/31* | (2013.01) |
| *G06V 20/52* | (2022.01) |
| *G08B 21/02* | (2006.01) |

(52) U.S. Cl.
CPC .......... *G06F 21/6254* (2013.01); *G06F 21/31* (2013.01); *G06V 20/52* (2022.01); *G06V 20/53* (2022.01); *G08B 21/02* (2013.01)

(58) Field of Classification Search
None
See application file for complete search history.

(56) References Cited

U.S. PATENT DOCUMENTS

| | | | |
|---|---|---|---|
| 9,189,606 B2 * | 11/2015 | Mebed | G06F 21/6245 |
| 10,043,014 B1 * | 8/2018 | Hadsall | G09G 5/003 |
| 10,394,188 B2 * | 8/2019 | Bostick | G03H 1/0011 |
| 10,410,499 B2 * | 9/2019 | Amir | G08B 13/2491 |
| 2009/0295534 A1 * | 12/2009 | Golander | G07C 9/28 340/5.2 |
| 2016/0210473 A1 * | 7/2016 | Cohen | G06F 21/60 |
| 2017/0126698 A1 * | 5/2017 | Minkovich | G06F 21/00 |
| 2019/0278927 A1 * | 9/2019 | Konishi | G06F 3/14 |
| 2021/0243186 A1 * | 8/2021 | Tormasov | G06F 21/32 |
| 2022/0083680 A1 * | 3/2022 | Tormasov | G06F 21/31 |

(Continued)

*Primary Examiner* — Lashonda Jacobs-Burton
(74) *Attorney, Agent, or Firm* — ArentFox Schiff LLP; Michael Fainberg

(57) ABSTRACT

Disclosed herein are systems and method for controlling data access, the method including: receiving a request to access data on a computing device; determining that the data requested for access has a first degree of confidentiality, wherein the first degree of confidentiality indicates that the data can only be accessed in an environment occupied by a threshold number of persons; retrieving sensor data from a plurality of sensors located in the environment; determining, based on the sensor data, a number of persons occupying the environment; determining whether the number of persons exceeds the threshold number of persons; and in response to determining that the number of persons exceeds the threshold number of persons, denying the request to access the data.

18 Claims, 5 Drawing Sheets

(56) References Cited

U.S. PATENT DOCUMENTS

2023/0196860 A1* 6/2023 Rebien ................. G06V 40/103
                                                        382/156
2023/0254554 A1* 8/2023 Hassan ................. H04W 12/65
                                                        348/164

* cited by examiner

SYSTEMS AND METHODS FOR CONTROLLING DATA ACCESS IN THE PRESENCE OF UNAUTHORIZED PERSONS

CROSS-REFERENCE TO RELATED APPLICATIONS

This application claims the benefit of U.S. Provisional Application No. 63/292,236, filed Dec. 21, 2022, which is herein incorporated by reference.

FIELD OF TECHNOLOGY

The present disclosure relates to the field of data security, and, more specifically, to systems and methods for controlling data access in the presence of unauthorized persons.

BACKGROUND

To ensure the privacy of access to information or to a communication channel, it is often necessary to securely authenticate the accessing user. This allows data to be provided to an individual that is authorized to access the data. However, in some cases, even if the accessing person is authenticated, another person in the presence of the authenticated person may be unauthorized to access the data and still have access via the authenticated person.

For example, if the authenticated person is accessing confidential health documents via a smartphone in a public area, a stranger may be able to view the confidential health documents by looking at the smartphone screen. This should be prevented because the privacy of the documents is compromised. Not only can the stranger view the documents, but can also take a photo of the smartphone screen and share the photo.

This issue also arises in other situations. For example, in e-learning systems, students often take exams or complete tasks, remotely. To ensure the integrity of an exam or task, one must consider whether a given student had help from any person in the presence of the student.

SUMMARY

In one exemplary aspect, the techniques described herein relate to a method for controlling data access, the method including: receiving a request to access data on a computing device; determining that the data requested for access has a first degree of confidentiality, wherein the first degree of confidentiality indicates that the data can only be accessed in an environment occupied by a threshold number of persons; retrieving sensor data from a plurality of sensors located in the environment; determining, based on the sensor data, a number of persons occupying the environment; determining whether the number of persons exceeds the threshold number of persons; and in response to determining that the number of persons exceeds the threshold number of persons, denying the request to access the data.

In some aspects, the techniques described herein relate to a method, wherein determining the number of persons occupying the environment further includes: defining a boundary of the environment; identifying persons present within the boundary; and including the identified persons in the number of persons occupying the environment.

In some aspects, the techniques described herein relate to a method, further including: in response to determining that the number of persons does not exceed the threshold number of persons, granting the request to access the data.

In some aspects, the techniques described herein relate to a method, further including: subsequent to granting the request to access the data, re-determining the number of persons occupying the environment; and in response to determining that the re-determined amount of persons exceeds the threshold number of persons, denying the request to access the data.

In some aspects, the techniques described herein relate to a method, wherein the first degree of confidentiality further indicates that at least one person in the threshold number of persons needs to be preauthorized to access the data, further including: identifying, using the sensor data, a person that generated the request to access the data on the computing device; determining whether the person is preauthorized to access the data; and in response to determining that the person is preauthorized and that the number of persons does not exceed the threshold number of persons, granting the request to access the data.

In some aspects, the techniques described herein relate to a method, further including: subsequent to denying the request to access the data, re-determining the number of persons occupying the environment; and in response to determining that the re-determined amount of persons does not exceed the threshold number of persons, granting the request to access the data.

In some aspects, the techniques described herein relate to a method, wherein the first degree of confidentiality indicates that the data can only be accessed when no more than the threshold number of persons have line of sight to an output of the data.

In some aspects, the techniques described herein relate to a method, further including: receiving another request to access different data on the computing device; determining that the different data requested for access has a second degree of confidentiality, wherein the second degree of confidentiality indicates that the different data can be partially accessed in the environment with more than the threshold number of persons; and in response to determining that the number of persons exceeds the threshold number of persons, granting the another request to access the different data with limited access rights.

In some aspects, the techniques described herein relate to a method, wherein the different data and the data are displayed on the computing device simultaneously based on the number of persons in the environment.

It should be noted that the methods described above may be implemented in a system comprising a hardware processor. Alternatively, the methods may be implemented using computer executable instructions of a non-transitory computer readable medium.

In some aspects, the techniques described herein relate to a method, wherein the limited access rights include one or more of: (1) outputting a portion of the different data, (2) restricting a subset of actions to interact with the different data from a plurality of actions, and (3) limiting an amount of time that the different data is output on the computing device.

In some aspects, the techniques described herein relate to a system for controlling data access, including: a memory; and a hardware processor communicatively coupled with the memory and configured to: receive a request to access data on a computing device; determine that the data requested for access has a first degree of confidentiality, wherein the first degree of confidentiality indicates that the data can only be accessed in an environment occupied by a threshold number of persons; retrieve sensor data from a plurality of sensors located in the environment; determine, based on the sensor data, a number of persons occupying the environment; determine whether the number of persons exceeds the threshold number of persons; and in response to determining that the number of persons exceeds the threshold number of persons, deny the request to access the data.

In some aspects, the techniques described herein relate to a non-transitory computer readable medium storing thereon computer executable instructions for controlling data access, including instructions for: receiving a request to access data on a computing device; determining that the data requested for access has a first degree of confidentiality, wherein the first degree of confidentiality indicates that the data can only be accessed in an environment occupied by a threshold number of persons; retrieving sensor data from a plurality of sensors located in the environment; determining, based on the sensor data, a number of persons occupying the environment; determining whether the number of persons exceeds the threshold number of persons; and in response to determining that the number of persons exceeds the threshold number of persons, denying the request to access the data.

The above simplified summary of example aspects serves to provide a basic understanding of the present disclosure. This summary is not an extensive overview of all contemplated aspects, and is intended to neither identify key or critical elements of all aspects nor delineate the scope of any or all aspects of the present disclosure. Its sole purpose is to present one or more aspects in a simplified form as a prelude to the more detailed description of the disclosure that follows. To the accomplishment of the foregoing, the one or more aspects of the present disclosure include the features described and exemplarily pointed out in the claims.

BRIEF DESCRIPTION OF THE DRAWINGS

The accompanying drawings, which are incorporated into and constitute a part of this specification, illustrate one or more example aspects of the present disclosure and, together with the detailed description, serve to explain their principles and implementations.

DETAILED DESCRIPTION

Figure 1:
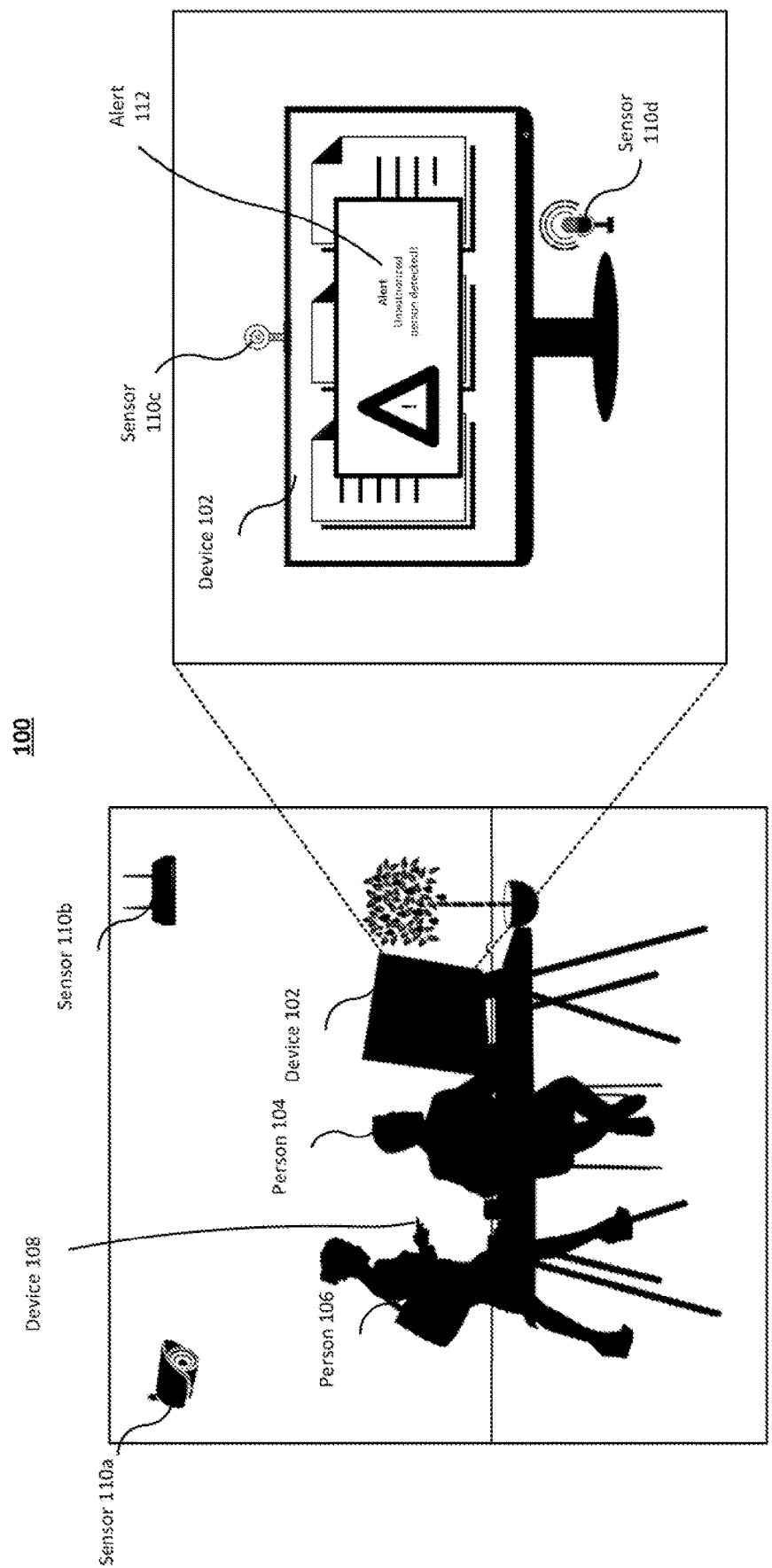
FIG. 1 is a block diagram illustrating a scenario in which an authorized person is accessing confidential data in the presence of unauthorized persons.

Exemplary aspects are described herein in the context of a system, method, and computer program product for controlling data access in the presence of unauthorized persons. Those of ordinary skill in the art will realize that the following description is illustrative only and is not intended to be in any way limiting. Other aspects will readily suggest themselves to those skilled in the art having the benefit of this disclosure. Reference will now be made in detail to implementations of the example aspects as illustrated in the accompanying drawings. The same reference indicators will be used to the extent possible throughout the drawings and the following description to refer to the same or like items.

In the examples provided in the background section, it is necessary to make sure that an information-accessing person is alone when familiarizing himself with confidential data or accessing information (e.g., text, audio, video, etc.) intended only for the accessing person. Accordingly, personal identification of the authorized person is only a portion of the solution. The other portion is to control the unwanted presence of any persons that are unauthorized to access data.

In the present disclosure, one objective is to obtain and parse information about the possible presence of any unauthorized persons in situations where the user should be alone (e.g., near a computer, in a specific room, etc.). Another objective is to apply policies for certain scenarios associated with the absence of unauthorized persons. In general, the present disclosure uses all available means to meet the first objective (i.e., to confirm that the authorized person is in a specific place and there are no other people (or unauthorized persons) near him/her. Said means include, but are not limited to, detecting signal connections (e.g., Bluetooth, Wi-Fi, etc.) and using sensors such as proximity sensors, volume sensors, motion sensors, temperature and humidity sensors, $CO/CO_2$ sensors, surveillance cameras, noise sensors, etc. Any indirect data may also be used (e.g., detection of electronic passes at the entrances to the premises, control of the number of people arriving/leaving the given premises, etc.).

As for the definition of certain policies, they may be determined depending on the situation. Policies may force complete isolation of the authorized person for data access at any degree, may enable partial access depending on the confidentiality of the information being access, and may define alerts (e.g., an alert for the person to isolate himself/herself to change access options).

On a technical level, the present disclosure describes detecting the number of physical bodies in a certain place in cases where there are any restrictions occupancy count (in this case, personal identification may not be needed). The present disclosure further describes generating access enablement decisions based on such detection and taking certain actions (e.g., restricting access to information) upon violation or compliance with the conditions for the physical presence of unauthorized persons.

FIG. 1 is a block diagram illustrating scenario 100 in which an authorized person is accessing confidential data in the presence of unauthorized persons. In scenario 100, person 104 is an authorized user of device 102 (e.g., a computer system described in FIG. 5). Person 104 may be requesting access to confidential data on device 102 (e.g., health documents that are only to be viewed by person 104). When person 106 walks by person 104, person 106 can view the output of the confidential data on device 102. In an ideal situation, when person 106 is in the presence of person 104 and device 102, the output of the confidential data should be blocked.

In the present disclosure, a security module is used to block said confidential data on device 102. In some aspects, the security module may generate alert 112 that notifies person 104 that an unauthorized person has been detected in the environment (i.e., person 106). In order to detect person 106, the security module may use any available sources of information, including electronic devices, wireless networks, sensors, tracking systems, access controls, accounting systems, and other indirect data sources. For example, a plurality of sensors 110 may be distributed around the environment where person 104 and device 102 are located.

In FIG. 1, sensor 110a is a security camera, sensor 110b is a Wi-Fi router, sensor 110c is a webcam, and sensor 110d is a microphone. Other sensors may include, but are not limited to, card scanners, heat map generators, lasers, biometric scanners, etc.

In one example, sensor 110a and/or sensor 110c may capture an image of person 106 and determine that there is an unauthorized person in the environment. In another example, person 106 may be using device 108 (e.g., a smartphone) that connects wirelessly to sensor 110b when person 106 enters the environment. In response to detecting a connection, the security module may determine that person 106 is in the environment. In yet another example, sensor 110d may capture a voice of person 106 and the security module may determine that person 106 is in the environment.

It should be noted that if device 108 that person 106 is using also has a security module of the present disclosure installed, when walking near person 104, any confidential data on device 108 may also be blocked temporarily by the security module (e.g., until person 106 walks away from person 104). There thus exist many dynamic blocking and enabling scenarios in the context of the present disclosure.

Figure 2:
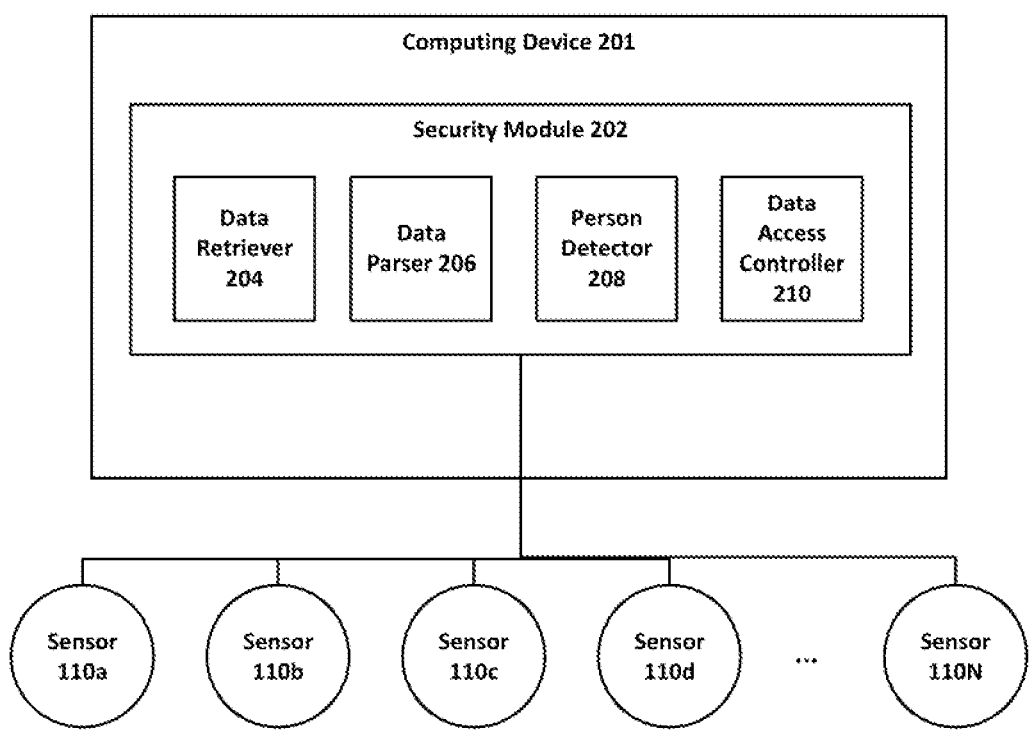
FIG. 2 is a block diagram illustrating a system for controlling data access in the presence of unauthorized persons.

FIG. 2 is a block diagram illustrating system 200 for controlling data access in the presence of unauthorized persons. Computing device 201 may be device 102 (e.g., a computer system described in FIG. 5). Installed on computing device 201 is security module 202 (described in FIG. 1). Security module 202 may be a component of authentication software or any software with a privacy feature. Security module 202 is made up of multiple components including: data retriever 204, data parser 206, person detector 208, and data access controller 210.

Data retriever 204 collects raw data from each of the sensors 110 connected to computing device 201. For example, data retriever 204 may receive videos from sensor 110a and 110c. Data retriever 204 may receive network information from sensor 110b (e.g., time-based reports indicating connection information, upload speeds, download speeds, etc.). Data retriever 204 may receive audio clips from sensor 110d. Data retriever 204 may receive images, text, etc., from sensor 110N.

Data parser 206 filters the retrieved data into a subset of data that includes an indication of persons. In other words, data parser 206 removes (e.g., deletes) all information where a person is not present. This may be security footage where no person is detected in a frame, or audio clips where no voice is detected. Data parser 206 may utilize computer vision and natural language processing techniques to search for signs of a person in the retrieved data.

Furthermore, in some aspects, data parser 206 may convert the data into a simplified and easy-to-store medium. For example, data parser 206 may convert a 20 minute video clip of a person using device 102 into a select number of facial image(s) of the person and a timestamp range indicative of when the person was in the video clip. Likewise, data parser 206 may convert a badge scan that includes several data points about a person who scanned his/her card to enter the environment (e.g., name, gender, date of birth, image, etc.) into text that includes basic information such as name and time of entry.

Person detector 208 may be used as an authentication tool. If a specific person is to be identified, person detector 208 may search through the parsed data generated by data parser 206 to determine whether the parsed data includes information corresponding to the specific person. Referring to FIG. 1, person 104 may be authorized to access confidential data on device 102. In order to authenticate person 104, person detector 208 may determine whether the parsed data (e.g., a facial images of persons in the environment) includes an identifier of person 104 (e.g., a facial image of person 104). Person detector 208 may store, in an identifier database, a plurality of identifiers of authorized personnel. For example, authorized personnel may be employees in an office. If FIG. 1 is depicting an office scenario, person 104 may be an employee and person 106 may be a visitor. Person detector 208 may successfully authenticate person 104 in response to determining that an identifier of person 104 found in the identifier database is present in recently captured sensor data.

Data access controller 210 is configured to determine a degree of confidentiality of each data object (e.g., file, application, process, etc.) being requested by a user. The degree of confidentially may be stored in the metadata of the data object. In some aspects, if the data object is encrypted, the degree of confidentiality may be determined by data access controller 210 as a function of the encryption strength. In some aspects, the degree of confidentiality may be assigned to a data object based on the contents or file type of a data object (e.g., health records may have a high degree of confidentiality and cooking recipes may have a lower degree of confidentiality in comparison, or ".exe" files may have a low degree of confidentiality compared to ".doc" or ".txt" files). In some aspects, data access controller 210 may retrieve the degree of confidentiality from a database of confidentiality degrees. This database may include a list of all data objects on a device and a respective pre-determined degree of confidentiality of each data object.

The degree of confidentiality may be a qualitative value (e.g., "low," "medium," "high," etc.) or a quantitative value (e.g., rated from 1-10 or 1-100, a fraction, a percentage, etc.). In some cases, the degree of confidentiality may not exist for a data object or may be set to a minimum amount. This indicates that anyone can access the data object as there are no restrictions associated with the data object. In some cases, the degree of confidentiality may be set to a maximum amount, which corresponds to the highest amount of access restrictions. Data access controller 210 may map a given degree of confidentiality to a plurality of conditions and restrictions. These mappings are policies that govern how to control data access. For example, a first policy may indicate that files of a first degree of confidentiality cannot be accessed in an environment with more than a threshold number of persons. A second policy may indicate that files of a second degree of confidentiality can be partially accessed in an environment with more than a threshold number of persons. The partial or limited access may involve outputting a portion of the data (e.g., a portion of text, redacted text, etc.), restricting a subset of actions to interact with the data from a plurality of actions (e.g., making the file read-only, preventing screenshots or sharing options), and limiting an amount of time that the data is output on the computing device (e.g., shown for 30 seconds only).

Figure 3:
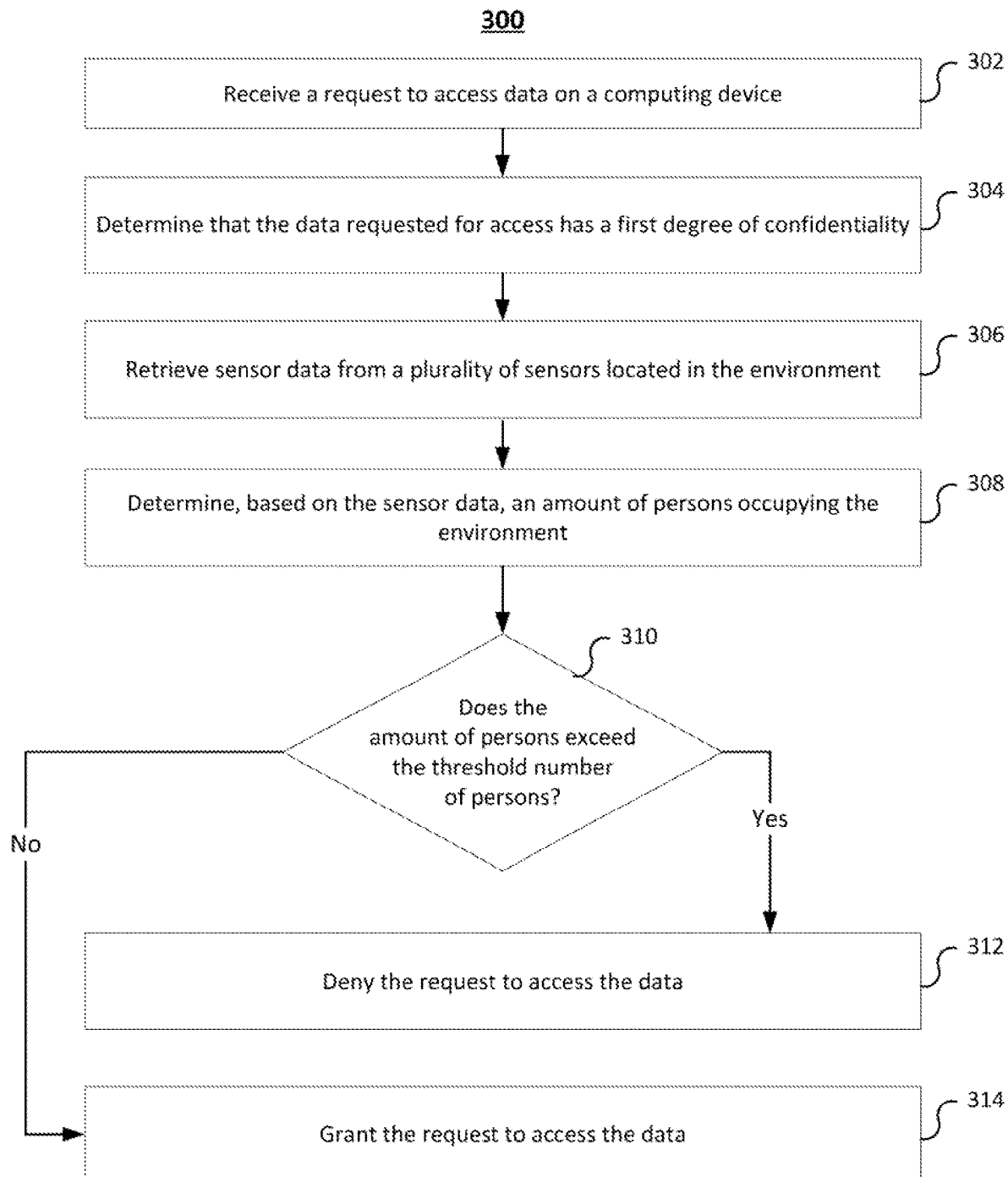
FIG. 3 illustrates a flow diagram of a method for granting/denying data access in the presence of unauthorized persons.

FIG. 3 illustrates a flow diagram of method 300 for granting/denying data access in the presence of unauthorized persons. At 302, security module 202 receives a request to access data on a computing device. For example, person 104 may click on a file on device 102 to view its contents. At 304, security module 202 determines that the data requested for access has a first degree of confidentiality. Here, the first degree of confidentiality indicates that the data can only be accessed in an environment occupied by a threshold number of persons. For example, the file that person 104 is attempting to open/view may be a confidential health report that should only be viewed by one person (i.e., person 104). While authenticating person 104 may be appropriate, if multiple people are in the room and can see the output of device 102, the privacy of the file is lost regardless of whether person 104 is accessing the output or not. Therefore, authenticating person 104 is considered a secondary/optional step.

At 306, security module 202 retrieves sensor data from a plurality of sensors located in the environment. For example, security module 202 may retrieve data from sensors 110a, 110b, 110c, and 110d. At 308, security module 202 determines, based on the sensor data, a number of persons occupying the environment. In some aspects, determining the number of persons occupying the environment further comprises defining a boundary of the environment, identifying persons present within the boundary, and including the identified persons in the number of persons occupying the environment.

As described previously, security module 202 may utilize data retriever 204 to retrieve data and data parser 206 to parse the retrieved data. Data parser 206 may utilize computer vision, natural language processing, and network connection information to detect signs of distinct people in the environment. Suppose that security module 202 detects person 104 and person 106 (i.e., 2 people).

For example, data parser 206 may receive an image of the environment and detect multiple faces in the image. In another example, data parser 206 may receive an audio clip and hear two different voices (e.g., the frequency and temporal characteristics of the audio clip may be classified into at least two distinct groups—person A and person B). In yet another example, the environment may be associated with a network device such as a router or a Bluetooth-enabled device. When a new person enters the environment, a computing device (e.g., a smartphone) in the possession of the new person may connect to or may make itself public by responding to a discovery message transmitted by the router and/or the Bluetooth-enabled device. Because a single person may have multiple devices that are capable of connecting with the router, data parser 206 may search for an indication that suggests that the devices belong to different people. For example, a time delay greater than a threshold period of time (e.g., 2 minutes) between the connection of a first device to the router and a second device to the router may be an indication to data parser 206 that the devices belong to different people (i.e., the second person entered the environment at a different time).

At 310, security module 202 determines whether the number of persons exceeds the threshold number of persons (e.g., 1). In response to determining that the number of persons exceeds the threshold number of persons, method 300 advances to 312, where security module 202 denies the request to access the data. In some aspects, in addition to denying the request, security module 202 may output an alert indicating why the request was denied and a remediation step (e.g., "change your location or isolate yourself). In response to determining that the number of persons does not exceed the threshold number of persons, method 300 advances to 314, where security module 202 grants the request to access the data.

It should be noted that the act of determining a number of persons occupying the environment is performed periodically or continuously. Because the number of persons may change, controlling data access needs to be done in real-time. For example, while person 104 is accessing data, person 106 may enter the room and accordingly, security module 202 may block the output of the data. Once person 106 exists the room, security module 202 may display the data once again.

On a technical level, subsequent to granting the request to access the data, security module 202 re-determines the number of persons occupying the environment, and in response to determining that the re-determined amount of persons exceeds the threshold number of persons, security module 202 denies the request to access the data. In contrast, subsequent to denying the request to access the data, security module 202 re-determines the number of persons occupying the environment, and in response to determining that the re-determined amount of persons does not exceed the threshold number of persons, security module 202 grants the request to access the data.

As discussed previously, authenticating person 104 as an authorized user is a secondary step. In an exemplary aspect, this step is dependent on whether the first degree of confidentiality indicates that at least one person in the threshold number of persons needs to be preauthorized to access the data. If the first degree of confidentiality includes this condition, security module 202 may identify, using the sensor data, a person that generated the request to access the data on the computing device (e.g., person 104). Security module 202 may determine whether the person is preauthorized to access the data, and in response to determining that the person is preauthorized and that the number of persons does not exceed the threshold number of persons, security module 202 may grant the request to access the data. Determining whether the person is preauthorized may be based on a data profile of the person. For example, using an input identifier (e.g., biometrics or a username), security module 202 may establish an identity of the person. Security module 202 may then refer to a data profile, which may be a database that includes identifiers of all authorized users of the data. If, for example, the input biometrics match an identifier in the data profile, security module 202 may grant access. If, the username is found in the data profile and the password provided by the person is correct, security module 202 may also grant access to the data.

The conditions of the degrees of confidentiality may be more restrictive as well. For example, the first degree of confidentiality may indicate that the data can only be accessed when no more than the threshold number of persons have line of sight to an output of the data. Accordingly, security module 202 may determine whether the threshold number of persons have line of sight to the output of the data. Evaluating the line of sight may require an image of the person. If the image is from a camera that is built-in to the computing device, security module 202 may determine whether the eyes of the person are visible in the image. If the eyes are visible in the image, security module 202 determines that the person can see the computing device and concludes that the person has line of sight to the output of the data. If the image is from a surveillance camera, security module 202 requires that the image include both the person and the computing device. In particular, security module 202 may draw a straight line between the person in the image and the computing device in the image. Security module 202 may then determine whether another identifiable object (e.g., a chair, table, etc.) is in between the person and computing device (e.g., is on the drawn line). If the another identifiable object is in between the person and the computing device, security module 202 determines that an obstacle exists between the person and the computing device—therefore line of sight is not established. In contrast, if no object serves as such an obstacle, security module 202 determines that the person can see the computing device and therefore is in line of sight with the output of the data.

Figure 4:
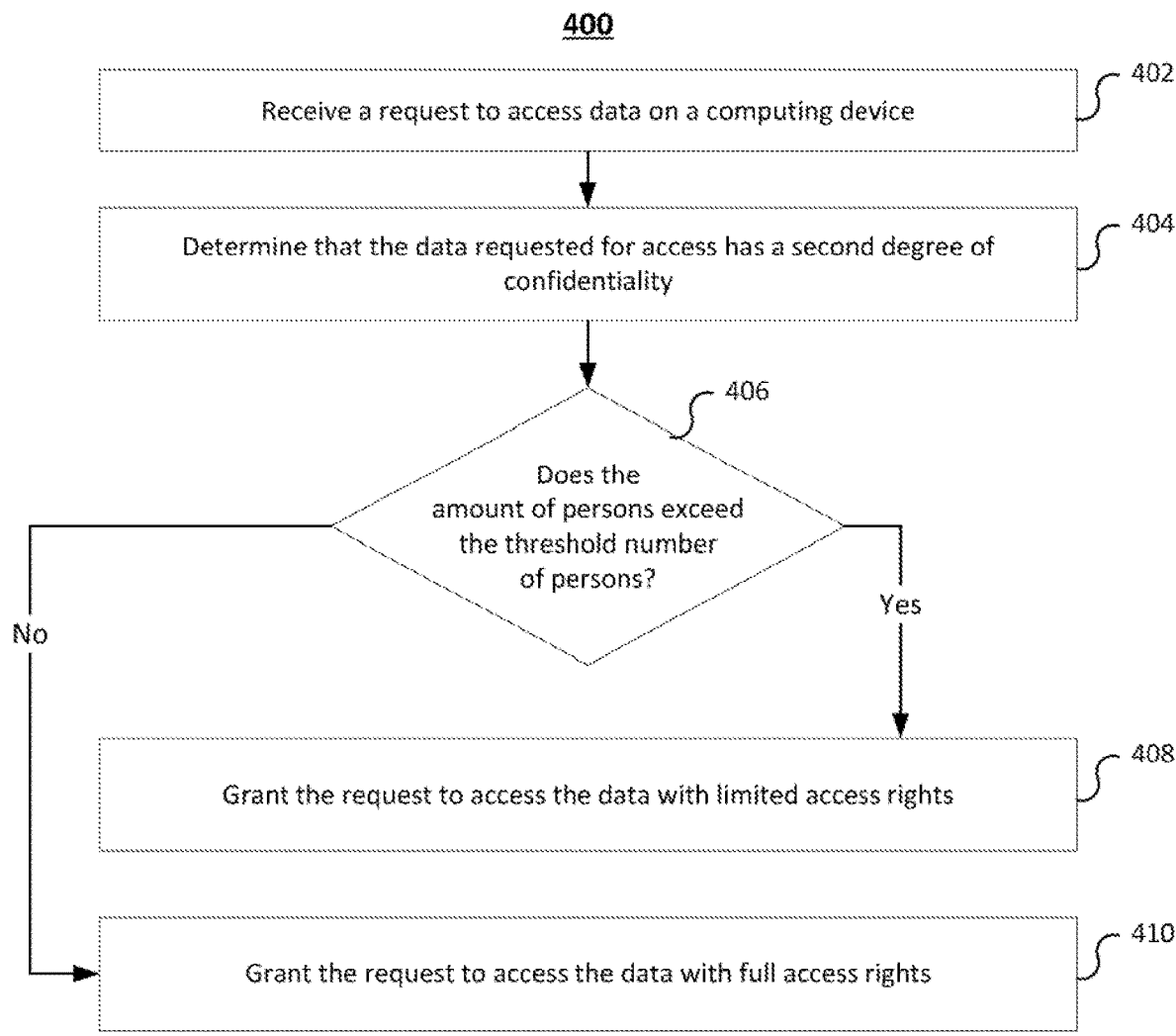
FIG. 4 illustrates a flow diagram of a method for limiting data access in the presence of unauthorized persons.

FIG. 4 illustrates a flow diagram of method 400 for limiting data access in the presence of unauthorized persons. At 402, security module 202 receives a request to access data on the computing device. At 404, security module 202 determines that the data requested for access has a second degree of confidentiality. The second degree of confidentiality indicates that the different data can be partially accessed in the environment with more than the threshold number of persons. In response to determining that the number of persons exceeds the threshold number of persons, method 400 advances to 408, where security module 202 grants the request to access the data with limited access rights. In response to determining that the number of persons exceeds the threshold number of persons, method 400 advances to 410, where security module 202 grants the request to access the data with full access rights.

In terms of limiting data access, in some aspects, security module 202 may adjust a medium of the confidential data and output the data in its adjusted medium. For example, referring to FIG. 1, person 106 may be using device 108 when walking near person 104. Person 106 may request confidential data (e.g., a PIN code to access an application on device 108). Suppose that the PIN code is normally outputted audibly (i.e., the original medium of the data is audio). Security module 202 on device 108 may determine that person 104 is in the environment that person 106 is in. Security module 202 may also confirm that the display of device 108 is not in the line of sight of person 104. In response to determining that person 104 is present in the environment, but cannot see the display, security module 202 may transform the audio-based medium to a visual-based medium. For example, rather than the PIN code being said aloud, the PIN code may instead be displayed without audio on device 108.

In another example, the original medium may be visual-based and security module 202 may transform the medium to an audio-based medium. In this case, security module 202 may determine that a PIN code is to be displayed on device 102, but the display is the line of sight of person 106. Security module 202 may then determine whether an audio output of the PIN code will be accessible to person 106 by determining whether device 102 is connected to headphones/earphones. In response to determining that an audio output would not be accessible to person 106, security module 202 may enable an audio output instead of a visual output.

Figure 5:
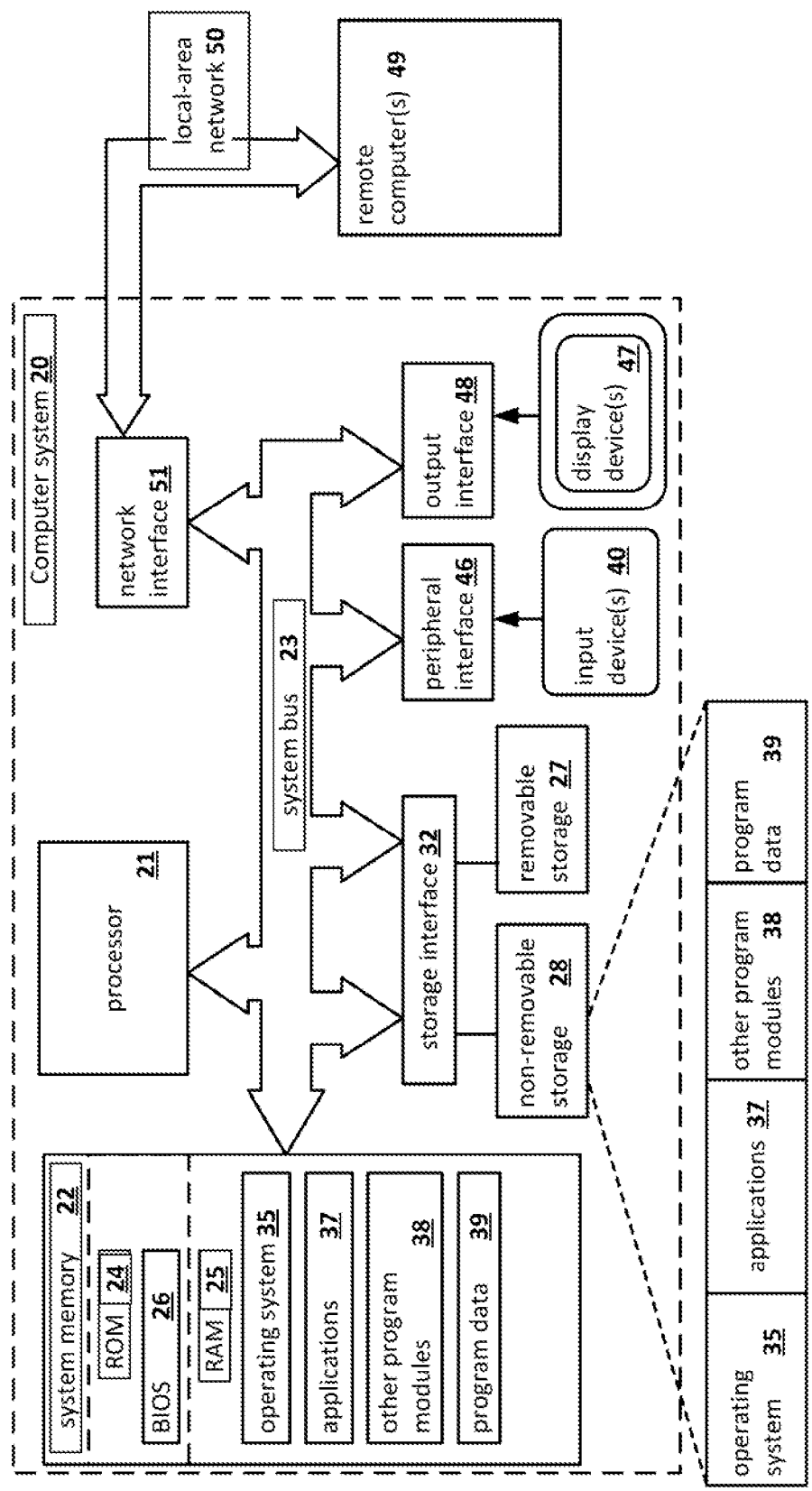
FIG. 5 presents an example of a general-purpose computer system on which aspects of the present disclosure can be implemented.

FIG. 5 is a block diagram illustrating a computer system 20 on which aspects of systems and methods for controlling data access in the presence of unauthorized persons may be implemented in accordance with an exemplary aspect. The computer system 20 can be in the form of multiple computing devices, or in the form of a single computing device, for example, a desktop computer, a notebook computer, a laptop computer, a mobile computing device, a smart phone, a tablet computer, a server, a mainframe, an embedded device, and other forms of computing devices.

As shown, the computer system 20 includes a central processing unit (CPU) 21, a system memory 22, and a system bus 23 connecting the various system components, including the memory associated with the central processing unit 21. The system bus 23 may comprise a bus memory or bus memory controller, a peripheral bus, and a local bus that is able to interact with any other bus architecture. Examples of the buses may include PCI, ISA, PCI-Express, Hyper-Transport™, InfiniBand™, Serial ATA, I²C, and other suitable interconnects. The central processing unit 21 (also referred to as a processor) can include a single or multiple sets of processors having single or multiple cores. The processor 21 may execute one or more computer-executable code implementing the techniques of the present disclosure. For example, any of commands/steps discussed in FIGS. 1-4 may be performed by processor 21. The system memory 22 may be any memory for storing data used herein and/or computer programs that are executable by the processor 21. The system memory 22 may include volatile memory such as a random access memory (RAM) 25 and non-volatile memory such as a read only memory (ROM) 24, flash memory, etc., or any combination thereof. The basic input/output system (BIOS) 26 may store the basic procedures for transfer of information between elements of the computer system 20, such as those at the time of loading the operating system with the use of the ROM 24.

The computer system 20 may include one or more storage devices such as one or more removable storage devices 27, one or more non-removable storage devices 28, or a combination thereof. The one or more removable storage devices 27 and non-removable storage devices 28 are connected to the system bus 23 via a storage interface 32. In an aspect, the storage devices and the corresponding computer-readable storage media are power-independent modules for the storage of computer instructions, data structures, program modules, and other data of the computer system 20. The system memory 22, removable storage devices 27, and non-removable storage devices 28 may use a variety of computer-readable storage media. Examples of computer-readable storage media include machine memory such as cache, SRAM, DRAM, zero capacitor RAM, twin transistor RAM, eDRAM, EDO RAM, DDR RAM, EEPROM, NRAM, RRAM, SONOS, PRAM; flash memory or other memory technology such as in solid state drives (SSDs) or flash drives; magnetic cassettes, magnetic tape, and magnetic disk storage such as in hard disk drives or floppy disks; optical storage such as in compact disks (CD-ROM) or digital versatile disks (DVDs); and any other medium which may be used to store the desired data and which can be accessed by the computer system 20.

The system memory 22, removable storage devices 27, and non-removable storage devices 28 of the computer system 20 may be used to store an operating system 35, additional program applications 37, other program modules 38, and program data 39. The computer system 20 may include a peripheral interface 46 for communicating data from input devices 40, such as a keyboard, mouse, stylus, game controller, voice input device, touch input device, or other peripheral devices, such as a printer or scanner via one or more I/O ports, such as a serial port, a parallel port, a universal serial bus (USB), or other peripheral interface. A display device 47 such as one or more monitors, projectors, or integrated display, may also be connected to the system bus 23 across an output interface 48, such as a video adapter. In addition to the display devices 47, the computer system 20 may be equipped with other peripheral output devices (not shown), such as loudspeakers and other audiovisual devices.

The computer system 20 may operate in a network environment, using a network connection to one or more remote computers 49. The remote computer (or computers) 49 may be local computer workstations or servers comprising most or all of the aforementioned elements in describing the nature of a computer system 20. Other devices may also be present in the computer network, such as, but not limited to, routers, network stations, peer devices or other network nodes. The computer system 20 may include one or more network interfaces 51 or network adapters for communicating with the remote computers 49 via one or more networks such as a local-area computer network (LAN) 50, a wide-area computer network (WAN), an intranet, and the Internet. Examples of the network interface 51 may include an Ethernet interface, a Frame Relay interface, SONET interface, and wireless interfaces.

Aspects of the present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store program code in the form of instructions or data structures that can be accessed by a processor of a computing device, such as the computing system 20. The computer readable storage medium may be an electronic storage device, a magnetic storage device, an optical storage device, an electromagnetic storage device, a semiconductor storage device, or any suitable combination thereof. By way of example, such computer-readable storage medium can comprise a random access memory (RAM), a read-only memory (ROM), EEPROM, a portable compact disc read-only memory (CD-ROM), a digital versatile disk (DVD), flash memory, a hard disk, a portable computer diskette, a memory stick, a floppy disk, or even a mechanically encoded device such as punch-cards or raised structures in a groove having instructions recorded thereon. As used herein, a computer readable storage medium is not to be construed as being transitory signals per se, such as radio waves or other freely propagating electromagnetic waves, electromagnetic waves propagating through a waveguide or transmission media, or electrical signals transmitted through a wire.

Computer readable program instructions described herein can be downloaded to respective computing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network interface in each computing device receives computer readable program instructions from the network and forwards the computer readable program instructions for storage in a computer readable storage medium within the respective computing device.

Computer readable program instructions for carrying out operations of the present disclosure may be assembly instructions, instruction-set-architecture (ISA) instructions, machine instructions, machine dependent instructions, microcode, firmware instructions, state-setting data, or either source code or object code written in any combination of one or more programming languages, including an object oriented programming language, and conventional procedural programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or WAN, or the connection may be made to an external computer (for example, through the Internet). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

In various aspects, the systems and methods described in the present disclosure can be addressed in terms of modules. The term "module" as used herein refers to a real-world device, component, or arrangement of components implemented using hardware, such as by an application specific integrated circuit (ASIC) or FPGA, for example, or as a combination of hardware and software, such as by a microprocessor system and a set of instructions to implement the module's functionality, which (while being executed) transform the microprocessor system into a special-purpose device. A module may also be implemented as a combination of the two, with certain functions facilitated by hardware alone, and other functions facilitated by a combination of hardware and software. In certain implementations, at least a portion, and in some cases, all, of a module may be executed on the processor of a computer system. Accordingly, each module may be realized in a variety of suitable configurations, and should not be limited to any particular implementation exemplified herein.

In the interest of clarity, not all of the routine features of the aspects are disclosed herein. It would be appreciated that in the development of any actual implementation of the present disclosure, numerous implementation-specific decisions must be made in order to achieve the developer's specific goals, and these specific goals will vary for different implementations and different developers. It is understood that such a development effort might be complex and time-consuming, but would nevertheless be a routine undertaking of engineering for those of ordinary skill in the art, having the benefit of this disclosure.

Furthermore, it is to be understood that the phraseology or terminology used herein is for the purpose of description and not of restriction, such that the terminology or phraseology of the present specification is to be interpreted by the skilled in the art in light of the teachings and guidance presented herein, in combination with the knowledge of those skilled in the relevant art(s). Moreover, it is not intended for any term in the specification or claims to be ascribed an uncommon or special meaning unless explicitly set forth as such.

The various aspects disclosed herein encompass present and future known equivalents to the known modules referred to herein by way of illustration. Moreover, while aspects and applications have been shown and described, it would be apparent to those skilled in the art having the benefit of this disclosure that many more modifications than mentioned above are possible without departing from the inventive concepts disclosed herein.

The invention claimed is:

1. A method for controlling data access, the method comprising:
    receiving a request to access data on a computing device;
    determining that the data requested for access has a first degree of confidentiality, wherein the first degree of confidentiality indicates that the data can only be accessed in an environment occupied by a threshold number of persons;
    retrieving sensor data from a plurality of sensors located in the environment;

determining, based on the sensor data, a number of persons occupying the environment;
determining whether the number of persons exceeds the threshold number of persons;
in response to determining that the number of persons exceeds the threshold number of persons, denying the request to access the data;
receiving another request to access different data on the computing device;
determining that the different data requested for access has a second degree of confidentiality, wherein the second degree of confidentiality indicates that the different data can be partially accessed in the environment with more than the threshold number of persons; and
in response to determining that the number of persons exceeds the threshold number of persons, granting the another request to access the different data with limited access rights.

2. The method of claim 1, wherein determining the number of persons occupying the environment further comprises:
defining a boundary of the environment;
identifying persons present within the boundary; and
including the identified persons in the number of persons occupying the environment.

3. The method of claim 1, further comprising:
in response to determining that the number of persons does not exceed the threshold number of persons, granting the request to access the data.

4. The method of claim 3, further comprising:
subsequent to granting the request to access the data, re-determining the number of persons occupying the environment; and
in response to determining that the re-determined amount of persons exceeds the threshold number of persons, denying the request to access the data.

5. The method of claim 1, wherein the first degree of confidentiality further indicates that at least one person in the threshold number of persons needs to be preauthorized to access the data, further comprising:
identifying, using the sensor data, a person that generated the request to access the data on the computing device;
determining whether the person is preauthorized to access the data; and
in response to determining that the person is preauthorized and that the number of persons does not exceed the threshold number of persons, granting the request to access the data.

6. The method of claim 1, further comprising:
subsequent to denying the request to access the data, re-determining the number of persons occupying the environment; and
in response to determining that the re-determined amount of persons does not exceed the threshold number of persons, granting the request to access the data.

7. The method of claim 1, wherein the first degree of confidentiality indicates that the data can only be accessed when no more than the threshold number of persons have line of sight to an output of the data.

8. The method of claim 1, wherein the different data and the data are displayed on the computing device simultaneously based on the number of persons in the environment.

9. The method of claim 1, wherein the limited access rights comprise one or more of:
(1) outputting a portion of the different data,
(2) restricting a subset of actions to interact with the different data from a plurality of actions, and
(3) limiting an amount of time that the different data is output on the computing device.

10. A system for controlling data access, comprising:
a memory; and
a hardware processor communicatively coupled with the memory and configured to:
receive a request to access data on a computing device;
determine that the data requested for access has a first degree of confidentiality, wherein the first degree of confidentiality indicates that the data can only be accessed in an environment occupied by a threshold number of persons;
retrieve sensor data from a plurality of sensors located in the environment;
determine, based on the sensor data, a number of persons occupying the environment;
determine whether the number of persons exceeds the threshold number of persons;
in response to determining that the number of persons exceeds the threshold number of persons, deny the request to access the data;
receive another request to access different data on the computing device;
determine that the different data requested for access has a second degree of confidentiality, wherein the second degree of confidentiality indicates that the different data can be partially accessed in the environment with more than the threshold number of persons; and
in response to determining that the number of persons exceeds the threshold number of persons, grant the another request to access the different data with limited access rights.

11. The system of claim 10, wherein the hardware processor is configured to determine the number of persons occupying the environment by:
defining a boundary of the environment;
identifying persons present within the boundary; and
including the identified persons in the number of persons occupying the environment.

12. The system of claim 10, wherein the hardware processor is configured to:
in response to determining that the number of persons does not exceed the threshold number of persons, grant the request to access the data.

13. The system of claim 12, wherein the hardware processor is configured to:
subsequent to granting the request to access the data, re-determine the number of persons occupying the environment; and
in response to determining that the re-determined amount of persons exceeds the threshold number of persons, deny the request to access the data.

14. The system of claim 10, wherein the first degree of confidentiality further indicates that at least one person in the threshold number of persons needs to be preauthorized to access the data, wherein the hardware processor is configured to:
identify, using the sensor data, a person that generated the request to access the data on the computing device;
determine whether the person is preauthorized to access the data; and
in response to determining that the person is preauthorized and that the number of persons does not exceed the threshold number of persons, grant the request to access the data.

15. The system of claim 10, wherein the hardware processor is configured to:
   subsequent to denying the request to access the data, re-determine the number of persons occupying the environment; and
   in response to determining that the re-determined amount of persons does not exceed the threshold number of persons, grant the request to access the data.

16. The system of claim 10, wherein the first degree of confidentiality indicates that the data can only be accessed when no more than the threshold number of persons have line of sight to an output of the data.

17. The system of claim 11, wherein the different data and the data are displayed on the computing device simultaneously based on the number of persons in the environment.

18. A non-transitory computer readable medium storing thereon computer executable instructions for controlling data access, including instructions for:
   receiving a request to access data on a computing device;
   determining that the data requested for access has a first degree of confidentiality, wherein the first degree of confidentiality indicates that the data can only be accessed in an environment occupied by a threshold number of persons;
   retrieving sensor data from a plurality of sensors located in the environment;
   determining, based on the sensor data, a number of persons occupying the environment;
   determining whether the number of persons exceeds the threshold number of persons;
   in response to determining that the number of persons exceeds the threshold number of persons, denying the request to access the data;
   receiving another request to access different data on the computing device;
   determining that the different data requested for access has a second degree of confidentiality, wherein the second degree of confidentiality indicates that the different data can be partially accessed in the environment with more than the threshold number of persons; and
   in response to determining that the number of persons exceeds the threshold number of persons, granting the another request to access the different data with limited access rights.

* * * * *